TELEPHONE STATION IDENTIFYING SYSTEM

Filed June 18, 1959

INVENTORS
JAMES D. CONFELD
THOMAS E. ELLIS
ADAM A. JORGENSEN
BY [signature]
ATTORNEY March 13, 1962 J. D. CONFELD ET AL 3,025,355

TELEPHONE STATION IDENTIFYING SYSTEM

Filed June 18, 1959

2 Sheets-Sheet 2

United States Patent Office 3,025,355
Patented Mar. 13, 1962

3,025,355

TELEPHONE STATION IDENTIFYING SYSTEM

James D. Confeld and Thomas E. Ellis, Rochester, and Adam A. Jorgensen, Victor, N.Y., assignors to General Dynamics Corporation, Rochester, N.Y., a corporation of Delaware Filed June 18, 1959, Ser. No. 821,155
8 Claims. (Cl. 179—17)

This invention relates to telephone systems and more particularly to an improved means for use in a telephone system for identifying a station on a multiparty line originating a call.

This invention will be particularly useful in toll ticketing systems such as the one shown and described in the Morris and Clement Patent No. 2,877,311 which is assigned to the same assignee as the present application. In the cited patent, identification of the calling station is accomplished through the use of a plurality of matrices which comprises as many individual party matrices as there are parties on the line. In addition, when terminal per line equipment is included in a terminal per station office, a terminal per line matrix is required. Each of the party matrices is equipped with forty output busses; ten each for the thousands, hundreds, tens and units digits. The busses are selectively connected through a plurality of resistors to provide a plurality of input terminals to the matrix in such a manner that a signal voltage applied to an input terminal will cause a distinctive signal to appear on one each of the thousands, hundreds, tens and units digit busses. Obviously, each matrix may be equipped with an input terminal corresponding to each possible four digit station designation. Thus, as shown in the cited patent, a means for identifying a calling station on a terminal per station multiparty line is provided by strapping from a common lead of the line circuit to an input terminal in the first party matrix for the first party, and to an input terminal in the second party matrix for the second party, etc. The strap for each party being completed to an appropriate input terminal as determined by the values of the four digits forming the directory number of each particular station.

When an identification is to be made in accordance with the system described in the cited Morris and Clement patent, it is necessary to determine which set of busses of the various matrices is to be examined. The proper set is chosen, and appropriate switching completed, in accordance with registered information which is indicative of the station on the multiparty line making the call. Various means of recording such information are well known to those skilled in the art, some means being mentioned in the cited Morris and Clement patent.

In the present invention, as in the cited patent, a matrix is used to derive the identity of the calling station. However, a novel means is disclosed herein which permits the use of a single matrix rather than a plurality of matrices.

Accordingly, it is the general object of the present invention to provide a new and improved system for identifying a station originating a call.

It is a more particular object of this invention to provide a means for directing an identifying signal to a matrix input terminal which is individual to the originating station.

Another object of the invention is to provide a system for identifying originating stations without requiring a plurality of matrices.

In accordance with the present invention, a single matrix may be used in a terminal per station office serving multiparty lines irrespective of the number of parties on the line. The reduction to a single matrix is accomplished by using an electronic device associated with each station on a multiparty line which is arranged to selectively provide a low impedance path between a common control lead, such as the sleeve lead, and a selected one of a plurality of input terminals to the matrix. Thus, an identifying signal may be passed through an electronic device, which is made conductive in accordance with registered information indicative of the station on the line originating the call, to pass the signal to an input terminal of the matrix which is individual to the originating station. The registration and recording of the information representing the identity of the calling station may be accomplished by established techniques such as those shown in the cited Morris and Clement Patent No. 2,877,311.

For the purposes of simplicity throughout this disclosure, standard techniques, such as those used in setting up a call through a switching system, simple registration, recording and sending of digits will not be described in detail. Furthermore, for convenience, the general case wherein a subscriber's directory number is composed of two letters and five digits will be considered. As is well known, the last four digits of a subscriber's directory number is sufficient to identify a specific station in an office using such a numbering plan. However, it should be obvious that the invention described herein is not limited to systems employing conventional numbering schemes. As an additional convenience, it will be assumed that multiparty lines are limited to a maximum of ten parties. However, the techniques of the present invention are applicable to systems serving any desired number of parties per line.

Although the invention is described as referring to telephone systems, it is apparent that the means described could find wide usage in the field of computers and other related fields. In short, the techniques of this invention are suitable for use in any application wherein it is desired to selectively pass a signal from a common lead through a selected one of a plurality of voltage responsive switches which may be made conductive in response to associated conditions.

Further objects and advantages of the invention, as applied to telephone systems, will become apparent as the following description proceeds and the features of novelty which characterize the invention will be pointed out in particular in the claims annexed to and forming a part of this specification.

For a better understanding of the invention, reference is made to the accompanying drawings which comprise two sheets of drawings in which.

It should be understood that only the details of the circuit necessary for a complete understanding of one embodiment of the invention have been shown. For example, a neon tube diode is illustrated as a suitable voltage responsive switch to carry out the objects of this invention. It will be obvious to those skilled in this or allied arts that other devices, such as transistors, could be used.

It is believed that the operation of the system may best be understood by an examination of the circuit together with an explanation to illustrate the means of passing an identifying signal through the selected voltage responsive switch.

Figure 1:
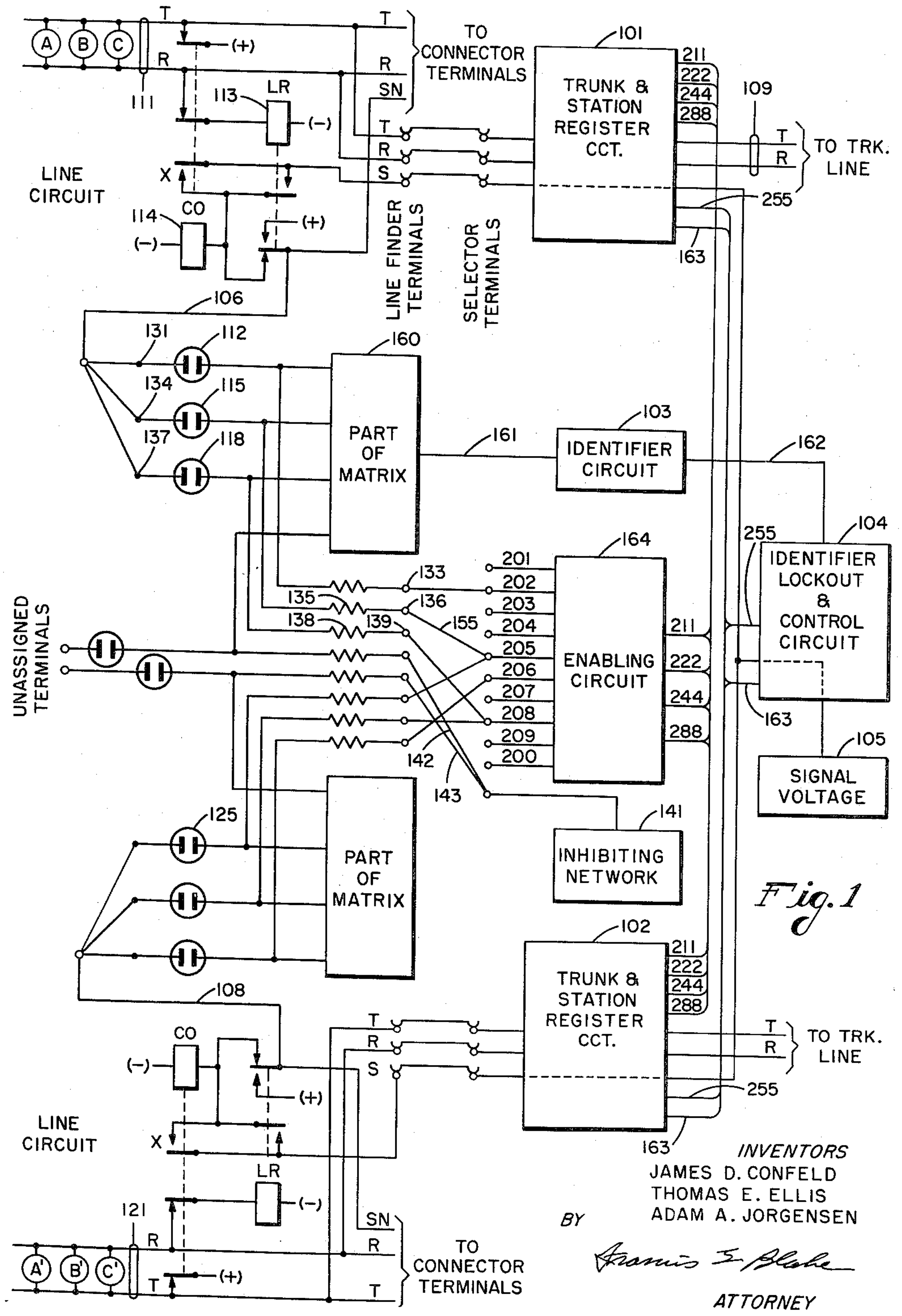
FIGURE 1 shows the principle circuit details.

Referring to FIG. 1 of the drawings, there are shown two line circuits, one each at the upper and lower left sides of the drawing. Line 111 with associated subscriber stations, such as A, B and C, is connected to the upper line circuit, while line 121 with associated stations A', B' and C' is connected to the lower line circuit. In the manner well known in the telephone art should a subscriber, such as one at station A on line 111, go off-hook to originate a call relay 113 will be operated. In response to the operation of relay 113 a linefinder-selector link will become associated with line 111 resulting in the operation of relay 114 and the release of relay 113. By directive impulses from his dial the subscriber at station A may control the selector of the local switching equipment to seize an idle outgoing trunk and associated station register circuit, such as 101, for use in establishing a connection to a subscriber in a different office. Similar actions will ensue when a subscriber on line 121 originates a call. Local connections may be completed through second selectors and/or connector circuits, not shown, in FIG. 1.

For the purposes of this discussion, it will be assumed that the resulting connection is one for which a toll ticket is to be automatically prepared and that trunk and station register circuit 101 is being used. The toll ticket may be prepared, for example, by the method described in the referenced Morris and Clement patent. In the course of the preparation of the toll ticket, it is necessary to determine the directory number designation of the station from which the call is being originated. In preparation for the required identification the calling subscriber had already caused to be registered in the trunk and station register circuit 101 information indicative of the identity of the particular station on the multiparty line originating the call. This information may be obtained by the use of special dials, or the dialing of a special identifying digit by the subscriber, or the use of oscillators or tuned circuits at the station, or by numerous other means which are known in the art. In any event the station identifying digit is recorded in the trunk and station register circuit 101 prior to the time that the calling station's directory number is to be identified. For convenience, in this discussion, it will be assumed that the station identifying digit is registered in decimal form, as by dialing, on the banks of a single motion switch.

At an appropriate time, such as on receipt of answer supervision, the trunk and station register circuit 101 signals the identifier lockout and control circuit 104 that the services of the identifier 103 are required. The identifier lockout and control circuit 104 is arranged to permit the identifier 103 to be associated with only one trunk at a time. When the identifier 103 and the identifier control and lockout circuit 104 are associated with trunk circuit 101, the sleeve lead of the trunk is extended through to the signal voltage circuit 105 where a grounded A.C. signal is applied thereto. This signal voltage is transmitted back via the sleeve lead through the trunk circuit, the switch train of selectors and line finder to the SN lead 106 of the line circuit associated with the originating station. The signal voltage is then presented, through jumpers, to terminals 131, 134 and 137 of the plurality of voltage responsive switches 112, 115 and 118 which are associated with the various stations on the calling line 111. In the illustrated embodiment of this invention, the voltage responsive switches are visualized as being neon tubes. A connection is completed from the other terminal of each neon tube to the matrix input point that corresponds to the directory number of the associated station. Accordingly, if it be assumed that subscriber line 111 has three subscribers, there will be associated with this line three neon tubes 112, 115 and 118, each of which have one terminal connected by jumpers to the SN lead 106 of the associated line circuit. A connection will also extend from the other terminal of each neon tube to the matrix. Each connection from the neon tube to the matrix being completed in such a manner that when a signal is applied to this connection, the signal may be detected on the thousands, hundreds, tens and units busses which correspond to the thousands, hundreds, tens and units digits of the directory number designation of the associated station on the multiparty line. When an identification is to be made in a system having more than ten thousand terminals, an additional group of busses may be added to identify the ten-thousands digits. Such matrices are well known, see for example the cited Morris and Clement patent and "Automatic Number Identification" by D. H. Pennoyer in the September 1958 issue of the Bell System Technical Journal.

Thus, as has been shown, when an identification is to be made a special signal is applied to the SN lead of the calling line which is, in turn, applied to one side of a plurality of neon tubes, one for each station associated with the calling line.

Figure 2:
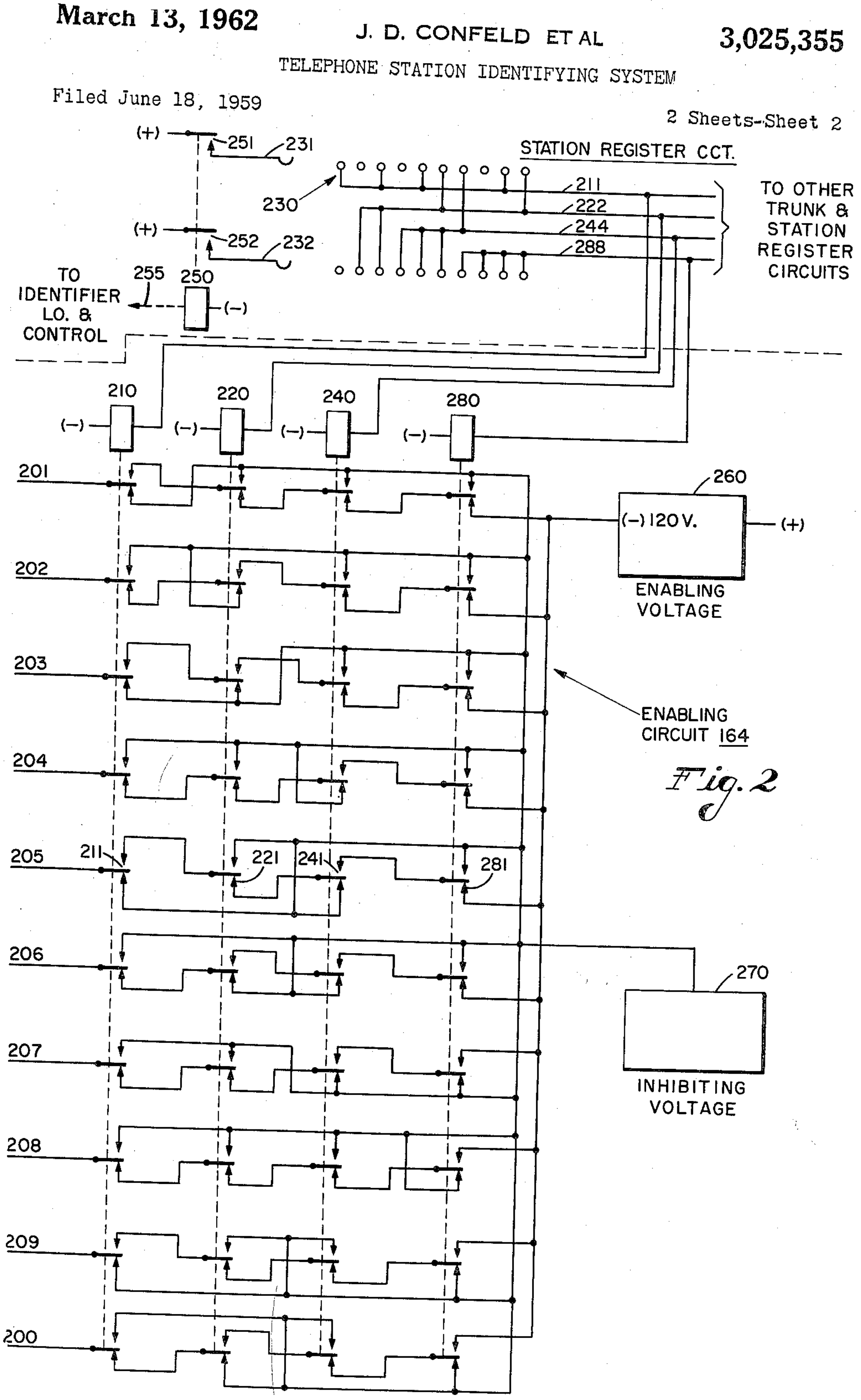
FIGURE 2 shows auxiliary circuit details.

Referring now to FIG. 2, there is shown therein a single motion switch 230 which is the station register of trunk and station register circuit 101. It will be recalled that the calling subscriber has caused to be registered in the station register information indicative of the identity of the particular station on the multiparty line from which the call is being originated. For example, if party one on the line is making the call, the wipers 231 and 232 of the station register switch 230 will be resting on the first set of terminals. In a similar manner, if party two on the line is originating the call, the wipers of the station register switch 230 will be on the second set of bank terminals, etc.

From the bank terminals of the station register 230, which is located within trunk and station register circuit 101, are four leads 211, 222, 244 and 288 which are multipled to other similar trunks such as 102. In addition, these four leads are multipled to the enabling circuit 164. A simplified version of the enabling circuit 164 is shown in FIG. 2 as consisting of four relays 210, 220, 240 and 280 and their associated contacts. In addition an enabling voltage 260 and an inhibiting voltage 270 are connected to the enabling circuit. The output of the enabling circuit is composed of the ten leads 201–200 which are also illustrated in FIG. 1.

Relay 250 of FIG. 2 is part of trunk and station register circuit 101 and is selectively operated by the identifier lockout and control circuit 104 applying ground to lead 255. Although lead 255 is multipled to other trunks such as 102, only relay 250 of trunk 101 is operated as control relays of trunk circuit 101 and of the identification control and lockout circuit 104 cooperate in a standard manner to permit only one trunk to be associated with the identification control and lockout circuit at a time. Thus when lockout and control circuit 104 is associated with a specific trunk, a ground will be placed on lead 255 to operate relay 250 which in turn, through its associated contacts 251 and 252, applies ground to the wipers 231 and 232 of station register switch 230. Depending upon the position of the wipers on the banks of the single motion switch, it will be observed that the ground from contacts 251 and 252 may be applied to one or two of the following leads: 211, 222, 244 and 288. In turn, one or two of the following relays will be thereby operated: 210, 220, 240 and 280. Furthermore, it will be observed that with one or two of the aforesaid relays operated, a −120 volt enabling voltage 260 will be placed on one of the ten leads designated 201–200 while all other leads within the group 201–200 are connected together and to the inhibiting voltage 270 shown at the lower right of FIG. 2 which is effective to maintain a low impedance ground on all these leads. Examination of the enabling circuit of FIG. 2 will reveal that the following chart summarizes the operation.

| Party Designation | Relay Operated | | | | Enabling Voltage On Lead |
|---|---|---|---|---|---|
| | 210 | 220 | 240 | 280 | |
| 1 | X | | | | 201 |
| 2 | | X | | | 202 |
| 3 | X | X | | | 203 |
| 4 | | | X | | 204 |
| 5 | X | | X | | 205 |
| 6 | | X | X | | 206 |
| 7 | | | X | X | 207 |
| 8 | | | | X | 208 |
| 9 | X | | | X | 209 |
| 0 | | X | | X | 200 |

Thus, it may be seen that one and only one of the ten enabling leads 201–200 will have a −120 enabling voltage placed thereon while all the remaining enabling leads of the group are connected to inhibiting voltage 270.

If it be assumed that the fifth party on line 111 originated the call then the single motion switch 230 must have been on step five and consequently when relay 250 operated, ground was placed on leads 211 and 244 to operate relays 210 and 240 and consequently −120 volt enabling voltage from source 260 is connected through normally closed contacts 281 of relay 280, operated contacts 241 of relay 240, normally closed contacts 221 of relay 220 and operated contacts 211 of relay 210 to lead 205. The enabling voltage is thereby connected through jumper 155 and resistor 135 to neon tube 115 thereby breaking down neon tube 115 and allowing it to conduct the grounded A.C. signal from source 105 through neon tube 115 to the matrix 160.

The identifier circuit 103, using techniques described in the cited Morris and Clement patent, can detect on which of the thousands, hundreds, tens and units buses, represented by lead 161, the signal voltage is present and passes this information, in suitable form, from the identifier 103 to the identifier lockout and control circuit 104 on leads represented by lead 162. In turn, the identification lockout and control circuit 104 sends the information through lead 163 to trunk circuit 101 which passes the information over the trunk line 109 to the distant office where the identification is suitably recorded. Lead 163, like lead 255, is multipled to all trunk circuits. Control relays in the trunk and identifier lockout and control circuit 104 cooperate to permit lead 163 to be effective in only one trunk at a time. At the conclusion of the above-described operation, the identifier lockout and control circuit 104 and the associated identifier 103 are released from trunk 101 and are free to perform a similar identification for any other trunk circuit, when required.

It should be noted that only neon tube 115 of the various neons associated with the calling line 111 was enabled. An inhibiting potential was held on all the other neon tubes associated with the same line. Thus, the only neon tube from the group associated with the calling line that was enabled is the one associated with the calling station and the signal voltage 105 can therefore be presented to only one matrix input point. Consequently, a simple and positive identification of the directory number of the calling station can be made by identifying the matrix input point to which the signal voltage is applied. While only neon tube 115 of line 111 was conducting, it will be noted that had a ground been present on the SN lead 108 of the other line circuit illustrated in FIG. 1 that neon tube 125 would also have been rendered conductive. That is, since party five of line 111 was being identified the neons associated with all party five's on any busy line will be made conductive. However, signal voltage 105 is controlled by identifier lockout and control circuit 104 so that it can be placed on only one SN lead at a time, namely the one associated with the line on which the identification is to be made. Thus, although various neon tubes may be conducting, the signal voltage is presented to the matrix at a single input point.

Consideration should also be given to the situation of unassigned connector terminals. However, before proper consideration may be given to these terminals a few other matters should be discussed. As a practical matter of convenience and economy in space and cost, the neon tubes and matrix may be wired on printed circuit cards. Thus with printed circuit connections between the neon tubes and the matrix input points, the wiring is permanent. That is, each connector terminal would have an associated matrix input point and a neon tube; no neon tube or matrix input point would belong to a specific line. Thus, with printed circuit components, a station may be associated with the proper neon tube and matrix input point by adding a jumper for each station between the line's SN lead, such as 106, and terminals 131, 134, 137, etc. illustrated at the left of the neon tubes. In addition, the enabling terminals 133, 136, 139, etc., for each neon tube must be jumpered to the proper one of the plurality of enabling leads 201–200. Consequently, the enabling terminals of the neon tubes associated with any unassigned connector terminals are not jumpered to any of the enabling leads 201–200 and therefore no inhibiting potential is applied to these enabling leads through leads 201–200 when an identification is being made. Consequently, the signal voltage passed through a conducting neon tube could feed into the matrix resistors and back to a "floating" enabling terminal from which it may re-enter the matrix to provide extraneous signals on the output of the thousands, hundreds, tens and units busses to the identifier. To prevent the false identifications which might result, the enabling leads of all unassigned neon tubes are connected together to inhibiting network 141 by jumpers 142, 143, etc. Inhibiting network 141 is similar to inhibiting voltage 270 in that it is effective to maintain a low impedance ground on any connected lead.

In summary, the present invention provides a new and improved means for identifying the directory number of a calling station on a multiparty line. The unique identification is made possible through the use of a voltage responsive switch per station which is rendered conductive in accordance with registered information indicative of the party on the line originating a call.

Although the present invention is described in connection with a telephone system for use in identifying the directory number of a calling subscriber, it should be understood that many other modifications and embodiments may be provided by those skilled in the arts within which the spirit and scope of this invention fall.

What is claimed and desired to be secured by Letters Patent of the United States is:

1. In a telephone system, a multiparty line connected to a line circuit having a control lead, each station on said multiparty line adapted to originate calls, a signal voltage, a matrix having a unique input point for each station on said line, means for applying said signal voltage to said control lead responsive to any one of said stations originating a call, and means for selectively transmitting said signal voltage to the matrix input point corresponding to the station originating the call whereby said station may be identified.

2. In a telephone system, a multiparty line connected to a line circuit having a control lead, each station on said multiparty line adapted to originate calls, a signal voltage, a matrix having a unique input terminal for each station on said line, means for registering information indicative of the station on said line originating a call, means for applying said signal voltage to said control lead responsive to any one of said stations originating a call, and means controlled in accordance with said registered information for selectively transmitting said signal voltage to the matrix input terminal corresponding to the station originating a call whereby said station may be identified.

3. In a telephone system, a multiparty line connected to a line circuit having a control lead, each station on said multiparty line adapted to originate calls, a matrix having a unique input terminal for each station on said line, a two terminal electronic device individual to each station on said line, means for connecting the first terminal of each of said devices to said control lead, means for individually connecting the second terminals of said devices to individual ones of said matrix input terminals, a signal voltage, an enabling voltage, each of said devices adapted to close a low impedance circuit between said control lead and the matrix input terminal to which its second terminal is connected responsive to the application of said signal voltage to said control lead and of said enabling voltage to that matrix input point, and means responsive to any one of said stations originating a call for selectively applying said enabling voltage to the matrix input terminal individual to said calling station whereby said signal voltage is conducted through the electronic device individual to the calling station to the matrix input terminal corresponding to said calling station so that an identification may be made of said station.

4. In a telephone system, a multiparty line connected to a line circuit having a control lead, each station of said multiparty line adapted to originate calls, a signal voltage, an enabling voltage, a matrix having a unique input terminal for each station on said line, a two terminal electronic device individual to each station on said line, each device interposed in a connection between its individually associated matrix input terminal and the control lead, each device having a first condition which is effective to block current flow between the associated matrix input terminal and the control lead, each device having a second condition which permits current flow therethrough, said second condition obtained in response to the conjoint application of said signal voltage to said control lead and of said enabling voltage to the matrix input terminal associated with said device, means for applying said signal voltage to said control lead in response to any one of said stations originating a call, means for applying said enabling voltage to the matrix input terminal individual to said originating station whereby said signal voltage may be selectively conducted through the device individual to the matrix input terminal corresponding to said calling station so that an identification may be made of said station.

5. In a telephone system, a multiparty line connected to a line circuit having a control lead, each station of said multiparty line adapted to originate calls, a signal voltage, an enabling voltage, a matrix having a unique input terminal for each station on said line, a two terminal electronic device individual to each station on said line, each device interposed in a connection between its individually associated matrix input terminal and the control lead, each device having a first condition which is effective to block current flow between the associated matrix input terminal and the control lead, each device having a second condition which permits current flow therethrough, said second condition obtained in response to the conjoint application of said signal voltage to said control lead and of said enabling voltage to the matrix input terminal associated with said device, means for registering information indicative of the station on said line originating a call, means for applying said signal voltage to said control lead in response to any one of said stations originating a call, means controlled in accordance with said registered information for applying said enabling voltage to the matrix input terminal individual to said originating station whereby said signal voltage may be selectively conducted through the device individual to the matrix input terminal corresponding to said calling station so that an identification may be made of said station.

6. A telephone system according to claim 5 in which the devices individual to the stations are gas-filled electronic tubes.

7. In a telephone system, a multiparty line connected to a line circuit having a control lead, each station of said multiparty line adapted to originate calls, an A.C. signal voltage, an enabling voltage, a current limiting resistor, a matrix having a unique input terminal for each station on said line, a two-terminal gas-filled electronic tube individual to each station on said line, each tube interposed in a connection between its individually associated matrix input terminal and the control lead, each tube having a first condition which is effective to block current flow between the associated matrix input terminal and the control lead, each tube having a second condition which permits current flow therethrough, said second condition obtained in response to the conjoint application of said signal voltage to said control lead and of said enabling voltage through said current limiting resistor to the matrix input terminal associated with said tube, means for registering information indicative of the station on said line originating a call, means for applying said signal voltage to said control lead in response to any one of said stations originating a call, means controlled in accordance with said registered information for applying said enabling voltage through said current limiting resistor to the matrix input terminal individual to said originating station whereby said signal voltage may be selectively conducted through the tube individual to the matrix input terminal corresponding to said calling station so that an identification may be made of said station.

8. In a telephone system, a multiparty line connected to a line circuit having a control lead, each station of said multiparty line adapted to originate calls, a signal voltage, an enabling voltage, an inhibiting potential, a matrix having a unique input terminal for each station on said line, a two terminal electronic device individual to each station on said line, each device interposed in a connection between its individually associated matrix input terminal and the control lead, each device having a first condition which is effective to block current flow between the associated matrix input terminal and the control lead, each device having a second condition which permits current flow therethrough, said second condition obtained in response to the conjoint application of said signal voltage to said control lead and of said enabling voltage to the matrix input terminal associated with said device, means for registering information indicative of the station on said line originating a call, means for applying said signal voltage to said control lead in response to any one of said stations originating a call, means controlled in accordance with said registered information for applying said enabling voltage to the matrix input terminal individual to said originating station and of applying said inhibiting potential to the matrix input terminals individual to all all other stations on said line whereby said signal voltage may be selectively conducted through the device individual to the matrix input terminal corresponding to said calling station so that an identification may be made of said station.

References Cited in the file of this patent

UNITED STATES PATENTS 2,877,311 Morris -------------- Mar. 10, 1959

Notice of Adverse Decision in Interference

In Interference No. 93,650 involving Patent No. 3,025,355, J. D. Confeld, T. E. Ellis and A. A. Jorgensen, Telephone station identifying system, final judgment adverse to the patentees was rendered Sept. 17, 1964, as to claims 1 and 2.

*[Official Gazette October 27, 1964.]*